United States Patent
Kim et al.

(10) Patent No.: US 12,139,781 B2
(45) Date of Patent: Nov. 12, 2024

(54) NON-GRAIN ORIENTED ELECTRICAL STEEL AND METHOD FOR MANUFACTURING SAME

(71) Applicant: POSCO, Pohang-si (KR)

(72) Inventors: Jae-Song Kim, Pohang-si (KR); Seung Il Kim, Pohang-si (KR); Jae Kim, Pohang-si (KR); Su-Yong Shin, Pohang-si (KR); Yong-Soo Kim, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 741 days.

(21) Appl. No.: 17/280,376

(22) PCT Filed: May 23, 2019

(86) PCT No.: PCT/KR2019/006219
§ 371 (c)(1),
(2) Date: May 5, 2021

(87) PCT Pub. No.: WO2020/067624
PCT Pub. Date: Apr. 2, 2020

(65) Prior Publication Data
US 2022/0033940 A1 Feb. 3, 2022

(30) Foreign Application Priority Data
Sep. 27, 2018 (KR) .................. 10-2018-0115268

(51) Int. Cl.
*C22C 38/38* (2006.01)
*C21D 8/02* (2006.01)
*C21D 9/46* (2006.01)
*C22C 38/00* (2006.01)
*C22C 38/02* (2006.01)
*C22C 38/06* (2006.01)
*C22C 38/20* (2006.01)
*C22C 38/28* (2006.01)

(52) U.S. Cl.
CPC ............ *C22C 38/38* (2013.01); *C21D 8/0205* (2013.01); *C21D 8/0226* (2013.01); *C21D 8/0236* (2013.01); *C21D 9/46* (2013.01); *C22C 38/001* (2013.01); *C22C 38/002* (2013.01); *C22C 38/02* (2013.01); *C22C 38/06* (2013.01); *C22C 38/20* (2013.01); *C22C 38/28* (2013.01)

(58) Field of Classification Search
CPC ..... C22C 38/38; C22C 38/001; C22C 38/002; C22C 38/02; C22C 38/06; C22C 38/20; C22C 38/28; C22C 38/004; C22C 38/00; C22C 38/04; C22C 38/26; C22C 38/34; C21D 8/0205; C21D 8/0226; C21D 8/0236; C21D 9/46; C21D 1/30; C21D 6/00; C21D 6/002; C21D 6/005; C21D 6/008; C21D 8/12; C21D 8/1244; C21D 8/1261; C21D 8/1283; C21D 8/1222; C21D 8/1233; Y02P 10/20; H01F 1/147; H01F 1/14791
See application file for complete search history.

(56) References Cited

U.S. PATENT DOCUMENTS

| | | | |
|---|---|---|---|
| 2001/0037841 A1 | 11/2001 | Murkami et al. | |
| 2013/0167987 A1 | 7/2013 | Kim et al. | |
| 2014/0345751 A1 | 11/2014 | Oda et al. | |
| 2019/0228891 A1 | 7/2019 | Natori et al. | |
| 2020/0232059 A1 | 7/2020 | Fujimura et al. | |

FOREIGN PATENT DOCUMENTS

| | | |
|---|---|---|
| CN | 101139681 A | 3/2008 |
| CN | 101346484 A | 1/2009 |
| CN | 103436796 A | 12/2013 |
| CN | 104438328 A | 3/2015 |
| EP | 1580289 B1 | 2/2015 |
| JP | H06-330255 A | 11/1994 |
| JP | H08-291375 A | 11/1996 |
| JP | 2001-172753 A | 6/2001 |
| JP | 2004-300535 A | 10/2004 |
| JP | 2005-113184 A | 4/2005 |
| JP | 2005-113185 A | 4/2005 |
| JP | 2006-070348 A | 3/2006 |
| JP | 2006-169611 A | 6/2006 |
| JP | 2007-016278 A | 1/2007 |
| JP | 2007-254801 A | 10/2007 |
| JP | 4018790 B2 | 12/2007 |
| JP | 2010-090474 A | 4/2010 |
| JP | 2012-067330 A | 4/2012 |
| JP | 2014-090474 A | 5/2014 |
| JP | 2018021242 A * | 2/2018 |
| JP | 6425962 B2 | 11/2018 |
| KR | 10-2015-0048689 A | 5/2015 |
| KR | 10-2015-0119433 A | 10/2015 |
| KR | 10-1630425 B1 | 6/2016 |
| KR | 10-2018-0071640 A | 6/2018 |
| WO | 2010/074447 A9 | 8/2010 |
| WO | 2013/038008 A1 | 3/2013 |
| WO | 2018-025941 A1 | 2/2018 |
| WO | 2018/117601 A1 | 6/2018 |

(Continued)

OTHER PUBLICATIONS

Chinese Office Action dated Apr. 28, 2022 issued in Chinese Patent Application No. 201980075057.9.

(Continued)

*Primary Examiner* — Anthony M Liang
*Assistant Examiner* — Danny N Kang
(74) *Attorney, Agent, or Firm* — Morgan, Lewis & Bockius LLP

(57) ABSTRACT

A non-oriented electrical steel sheet according to an embodiment of the present invention includes: in wt %, C at 0.004 wt % or less (excluding 0 wt %), Si at 2.5 to 4.0 wt %, P at 0.1 wt % or less (excluding 0 wt %), Al at 0.3 to 2.0 wt %, N at 0.003 wt % or less (excluding 0 wt %), S at 0.003 wt % or less (excluding 0 wt %), Mn at 0.15 to 2.5 wt %, Cr at 0.5 wt % (excluding 0 wt %), and the balance including Fe and other impurities unavoidably added thereto; satisfies the following Equation 1; and has an average grain size of 20 μm or less.

$$[Mn] \geq 1450 \times [S] - 0.8 \qquad \text{[Equation 1]}$$

(In Equation 1, [Mn] and [S] represent a content (wt %) of Mn and S, respectively.).

5 Claims, No Drawings

(56) References Cited

FOREIGN PATENT DOCUMENTS

| | | |
|---|---|---|
| WO | 2018/147044 A1 | 8/2018 |
| WO | 2018-164185 A1 | 9/2018 |

OTHER PUBLICATIONS

International Search Report issued in corresponding International Patent Application No. PCT/KR2019/006219 dated Aug. 12, 2019.
Extended European Search Report dated May 31, 2021, issued in corresponding European Patent Application No. 19866283.5.

* cited by examiner

NON-GRAIN ORIENTED ELECTRICAL STEEL AND METHOD FOR MANUFACTURING SAME

CROSS-REFERENCE OF RELATED APPLICATIONS

This application is the U.S. National Phase under 35 U.S.C. § 371 of International Patent Application No. PCT/KR2019/006219, filed on May 23, 2019, which in turn claims the benefit of Korean Application No. 10-2018-0115268, filed on Sep. 27, 2018, the entire disclosures of which applications are incorporated by reference herein.

TECHNICAL FIELD

The present invention relates to a non-oriented electrical steel sheet and a manufacturing method thereof. Specifically, the present invention relates to a non-oriented electrical steel sheet and a manufacturing method thereof that may simultaneously achieve high strength characteristics and magnetic characteristics of low iron loss for energy efficiency by adding an appropriate amount of Mn and S elements to the steel sheet and controlling a diameter of a grain to be small.

BACKGROUND ART

As interest in efficient use of energy has recently increased, efforts for increasing efficiency of motors used in electric devices such as large generators or eco-friendly vehicles such as hybrid electric vehicles (HEV) or electric vehicles (EV) are being attempted. As part of that, efforts are being undertaken to obtain a faster rotational speed than that of a typical motor by modulating a frequency like a BLDC motor. Particularly, in a case of a motor used in a driving part of a hybrid vehicle or an electric vehicle, it is necessary to obtain high power within a limited range, and a high rotation speed is required. In this case, since centrifugal force received by a rotor of the motor is proportional to a square of a rotation speed, when the motor rotates at high speed, it exceeds yield strength that a general electric steel sheet may withstand, which acts as a factor that lowers stability and durability of the motor. Therefore, a high-strength material is required for a rotor of a device that rotates at high speed. In addition, in the case of the material used as the rotor of the motor, it is necessary to reduce an eddy current loss caused by a high frequency in addition to the strength, but when an integrated rotor is made of high-strength carbon steel for the purpose of improving strength, the eddy current loss of the rotor increases, so that the overall efficiency of the motor is reduced. Therefore, there is a need for research on a manufacturing technology of an electrical steel sheet that may satisfy both high strength characteristics and low iron loss characteristics. As part of the research, a technology that improves strength by forming a structure other than ferrite in steel, a technology that improves strength by adding a special alloy element, and a technology that achieves both iron loss characteristics and strength characteristics by controlling a grain size to be large in a state before cold rolling or additional processing, have been proposed. However, in the technology of forming the structure other than ferrite, iron loss and magnetic flux density rapidly deteriorate due to presence of a nonmagnetic abnormal structure of pearlite, martensite, or austenite inside the steel, and when it is applied to a rotor, efficiency of a motor is drastically reduced. The technology of adding the special alloy element also has a problem that magnetism is rapidly deteriorated, and there is limitation depending on application. In addition, in the case of the technology of controlling the grain size to be large before the cold rolling, in a high-strength electrical steel sheet with many non-recrystallized structures, an effect thereof is insignificant, and it is difficult to effectively improve magnetic characteristics.

DISCLOSURE

Description of the Drawings

An embodiment of the present invention is to provide a non-oriented electrical steel sheet and a manufacturing method thereof. Specifically, the present invention relates to a non-oriented electrical steel sheet and a manufacturing method thereof that may simultaneously achieve high strength characteristics and magnetic characteristics of low iron loss for energy efficiency by adding an appropriate amount of Mn and S elements to the steel sheet and controlling a diameter of a grain to be small.

A non-oriented electrical steel sheet according to an embodiment of the present invention includes: in wt %, C at 0.004 wt % or less (excluding 0 wt %), Si at 2.5 to 4.0 wt %, P at 0.1 wt % or less (excluding 0 wt %), Al at 0.3 to 2.0 wt %, N at 0.003 wt % or less (excluding 0 wt %), S at 0.003 wt % or less (excluding 0 wt %), Mn at 0.15 to 2.5 wt %, Cr at 0.5 wt % (excluding 0 wt %), and the balance including Fe and other impurities unavoidably added thereto; satisfies the following Equation 1; and has an average grain size of 20 μm or less.

$$[Mn] \geq 1450 \times [S] - 0.8 \quad \text{[Equation 1]}$$

(In Equation 1, [Mn] and [S] represent a content (wt %) of Mn and S, respectively.)

The non-oriented electrical steel sheet may further include one or more of Ti at 0.003 wt % or less, Nb at 0.003 wt % or less, and Cu at 0.1 wt % or less.

A density of sulfides having a diameter of 1 nm to 0.1 μm may be 250,000/mm$^2$ or less.

The sulfide may include MnS, MnS, or CuS.

A magnetic flux density ($B_{50}$) induced in a magnetic field of 5000 may be 1.61 T or more, and the non-oriented electrical steel sheet may have a yield strength of 500 MPa or more.

Iron loss ($W_{10/400}$) measured after stress relief annealing that is performed at a temperature of 750° C. for 2 hours may be 12 W/kg or less.

A manufacturing method of a non-oriented electrical steel sheet according to another embodiment of the present invention includes: heating a slab that contains C at 0.004 wt % or less (excluding 0 wt %), Si at 2.5 to 4.0 wt %, P at 0.1 wt % or less (excluding 0 wt %), Al at 0.3 to 2.0 wt %, N at 0.003 wt % or less (excluding 0 wt %), S at 0.003 wt % or less (excluding 0 wt %), Mn at 0.15 to 2.5 wt %, Cr at 0.5 wt % (excluding 0 wt %), and the balance including Fe and other impurities unavoidably added thereto and satisfies Equation 1 below; hot rolling the slab to manufacture a hot rolled sheet; cold rolling the hot rolled sheet to manufacture a cold rolled sheet; and final annealing the cold rolled sheet at a temperature of 710 to 820° C.

$$[Mn] \geq 1450 \times [S] - 0.8 \quad \text{[Equation 1]}$$

(In Equation 1, [Mn] and [S] represent a content (wt %) of Mn and S, respectively.)

The slab may further include one or more of Ti at 0.003 wt % or less, Nb at 0.003 wt % or less, and Cu at 0.1 wt % or less.

The slab may be heated at 1100° C. to 1250° C.

The manufacturing method of the non-oriented electrical steel sheet may further include, after the manufacturing of the hot rolled sheet, annealing the hot rolled sheet at a temperature of 850 to 1200° C.

The manufacturing method of the non-oriented electrical steel sheet may further include, after the final annealing, stress relief annealing that is performed in a temperature range of 700 to 900° C.

According to the non-oriented electrical steel sheet according to the embodiment of the present invention, it is possible to simultaneously achieve high strength characteristics and magnetic characteristics of low iron loss for energy efficiency by adding an appropriate amount of Mn and S elements to the steel sheet and controlling a grain size to be small.

In addition, according to the non-oriented electrical steel sheet according to the embodiment of the present invention, by effectively lowering a sulfide inside steel, crystal growth may be improved in a stress relief annealing process, so that a non-oriented electrical steel sheet with low iron loss may be obtained after the stress relief annealing.

In addition, according to the non-oriented electrical steel sheet according to the embodiment of the present invention, it is possible to stably secure, prior to stress relief annealing, a magnetic flux density and yield strength characteristics.

Further, the non-oriented electrical steel sheet according to the embodiment of the present invention provides optimized characteristics for a high-efficiency motor, especially a permanent magnet insertion type of motor such as a driving motor for a vehicle.

MODE FOR INVENTION

The technical terms used herein are to simply mention a particular embodiment and are not meant to limit the present invention. An expression used in the singular encompasses an expression of the plural, unless it has a clearly different meaning in the context. In the specification, it is to be understood that the terms such as "including", "having", etc., are intended to indicate the existence of specific features, regions, numbers, stages, operations, elements, components, and/or combinations thereof disclosed in the specification, and are not intended to preclude the possibility that one or more other features, regions, numbers, stages, operations, elements, components, and/or combinations thereof may exist or may be added.

When referring to a part as being "on" or "above" another part, it may be positioned directly on or above another part, or another part may be interposed therebetween. In contrast, when referring to a part being "directly above" another part, no other part is interposed therebetween.

Unless otherwise defined, all terms used herein, including technical or scientific terms, have the same meanings as those generally understood by those with ordinary knowledge in the field of art to which the present invention belongs. Terms defined in commonly used dictionaries are further interpreted as having meanings consistent with the relevant technical literature and the present disclosure, and are not to be construed as having idealized or very formal meanings unless defined otherwise.

Unless otherwise stated, % means % by weight, and 1 ppm is 0.0001% by weight.

In embodiments of the present invention, inclusion of additional elements in a steel component means replacing the balance iron (Fe) by an additional amount of the additional elements.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In the embodiment of the present invention, by optimizing a composition in a non-oriented electrical steel sheet, particularly amounts of Mn and S which are major additives, and controlling a grain size to be small, high strength characteristics and magnetic characteristics of low iron loss for energy efficiency are simultaneously achieved.

A non-oriented electrical steel sheet according to an embodiment of the present invention includes: C at 0.004 wt % or less (excluding 0 wt %), Si at 2.5 to 4.0 wt %, P at 0.1 wt % or less (excluding 0 wt %), Al at 0.3 to 2.0 wt %, N at 0.003 wt % or less (excluding 0 wt %), S at 0.003 wt % or less (excluding 0 wt %), Mn at 0.15 to 2.5 wt %, Cr at 0.5 wt % (excluding 0 wt %), and the balance including Fe and other impurities unavoidably added thereto.

First, the reason for limiting the components of the non-oriented electrical steel sheet will be described.

C at 0.004 wt % or Less

Carbon (C) is preferably contained in an amount of 0.004 wt % or less since it causes magnetic aging in the electrical steel sheet to be finally manufactured to deteriorate its magnetic characteristics during use. As the content of C is lower, the magnetic characteristic thereof may be improved, and thus, more specifically, the content thereof may be 0.003 wt % or less.

Si at 2.5 to 4.0 wt %

Silicon (Si) is added as a component that increases specific resistance to lower eddy current loss during iron loss. In addition, when Si is added, there is an effect of increasing strength of a material. When too little Si is added, the above-mentioned effect may not be sufficiently provided. In contrast, when too much Si is included, cold rolling properties may deteriorate and plate fracture may occur. Specifically, Si may be included in an amount of 2.6 to 3.5 wt %.

P at 0.1 wt % or Less

Phosphorus (P) is added to increase specific resistance and improve a texture to improve magnetism. However, when P is excessively added, since cold rolling properties deteriorate, the content of P is preferably limited to 0.1 wt % or less. More specifically, P may be included in an amount of 0.005 to 0.05 wt %.

Al at 0.3 to 2.0 wt %

Aluminum (Al) is an effective component to reduce eddy current loss by increasing specific resistance, and although it has a lower effect than Si, it provides an effect of increasing strength when added. When too little Al is added, AlN may be finely precipitated and magnetism may be deteriorated. In contrast, when too much Al is added, processability may deteriorate. Specifically, Al may be included in an amount of 0.5 to 1.5 wt %.

N at 0.003 wt % or Less

Nitrogen (N) is desirable to be contained as little as possible because it suppresses grain growth by forming fine and long AlN precipitates inside and deteriorates iron loss. In the embodiment of the present invention, the content of N is limited to 0.003 wt % or less. More specifically, N may be included at 0.002 wt % or less.

S at 0.003 wt % or Leas

Sulfur (S) is preferable to be controlled to be a small amount because it forms fine precipitates of MnS and CuS to interfere with grain growth and deteriorate magnetic characteristics. In the embodiment of the present invention, the content of S is limited to 0.003 wt % or less. More specifically, S may be included at 0.002 wt % or less.

Mn at 0.15 to 2.5 wt %

When too little manganese (Mn) is added, a fine MnS precipitate is formed to suppress crystal growth, thereby deteriorating magnetism. Therefore, it is preferable to add an appropriate amount of Mn so that the MnS precipitate is coarsely formed. In addition, when an appropriate amount of Mn is added, the component of S may be prevented from being precipitated into CuS, which is a finer precipitate, and thus magnetism may be prevented from deteriorating. However, when Mn is excessively added, the magnetism may be lowered. Therefore, Mn may be included in the above-mentioned range. More specifically, Mn may be included in an amount of 0.2 to 2.3 wt %.

In the embodiment of the present invention, Mn and S may be included to satisfy Equation 1 below.

$$[Mn] \geq 1450 \times [S] - 0.8 \quad \text{[Equation 1]}$$

(In Equation 1, [Mn] and [S] represent a content (wt %) of Mn and S, respectively.)

As shown in Equation 1, when a large amount of Mn is added, occurrence of fine precipitates may be suppressed by stabilizing an S precipitate to suppress re-dissolution in the electrical steel sheet in the hot rolling process and the hot rolled plate annealing process. Specifically, a density of sulfides having a diameter of 1 nm to 0.1 μm may be 250,000/mm² or less. In this case, the diameter of the sulfide, that is, of the S precipitate, means a diameter of an imaginary circle having the same area as the sulfide. A reference plane is not particularly limited, and it may be a plane parallel to a rolled plane (ND plane). More specifically, the density of sulfide may be 10,000/mm² to 240,000/mm².

The sulfide may include MnS. When it further includes Cu, it may include MnS and CuS.

Cr at 0.5 wt % or Less

Chromium (Cr) is known as an element that improves iron loss by increasing specific resistance, while in the embodiment of the present invention, it makes the magnetic flux density inferior, and in particular, makes the iron loss after stress relief annealing inferior, thereby the addition should be suppressed as much as possible. More specifically, Cr may be included in an amount of 0.001 to 0.2 wt %.

One or more of Ti at 0.003 wt % or less, Nb at 0.003 wt % or less, and Cu at 0.1 wt % or less may be included.

Titanium (Ti) and niobium (Nb) suppress grain growth by forming fine Ti(Nb)CN precipitates. When Ti and Nb are contained in excess of 0.003 wt %, since a large amount of fine precipitates are generated, deteriorating the texture, deteriorating magnetism, and suppressing crystal growth in the stress relief annealing process, the content of Ti and Nb is limited to 0.003 wt % or less.

When copper (Cu) is added in an excessive amount, it is precipitated into CuS that is a fine precipitate, and may deteriorate magnetism. Therefore, Cu may be added in an amount of 0.1 wt % or less.

Other Impurities

In addition to the above-described elements, impurities that are inevitably mixed may be included. The balance is iron (Fe), and when additional elements other than the above-described elements are added, they are included by replacing the balance of iron (Fe).

In the non-oriented electrical steel sheet according to the embodiment of the present invention, an average grain size may be 20 μm or less. The grain size means a diameter of an imaginary circle with the same area as the grain. A reference plane is not particularly limited, and it may be a plane parallel to a rolled plane (ND plane).

The grain size and strength tend to be inversely proportional, and by keeping the grain size as small as possible, it may contribute to the improvement of the strength. In addition, the sulfide may delay grain growth during the stress relief annealing process to worsen iron loss after the stress relief annealing. In the embodiment of the present invention, the aforementioned Equation 1 is proposed in order to control the density of sulfides to be small, and the strength and magnetism of the non-oriented electrical steel sheet may be simultaneously achieved through the control of the grain size and the control of Equation 1. More specifically, the average grain size may be 1 to 18 μm.

The grains that form the non-oriented electrical steel sheet include a recrystallized structure in which the non-recrystallized structure processed in the cold rolling process is recrystallized in the final annealing process. Specifically, it may include 15 vol % or more of the recrystallized structure. More specifically, it may include 50 vol % or more of the recrystallized structure. The recrystallized structure generally has a dislocation density of $10^7$ lines/cm² or less, and generally, it may be distinguished from a non-recrystallized structure by utilizing an orientation distribution within 1 degree when observed through an electron microscope.

As described above, the non-oriented electrical steel sheet according to the embodiment of the present invention may simultaneously secure strength and magnetism.

Specifically, a magnetic flux density ($B_{50}$) induced in a magnetic field of 5000 Nm may be 1.61 T or more, and a yield strength may be 500 MPa or more. More specifically, the magnetic flux density ($B_{50}$) may be 1.64 to 1.75 T, and the yield strength may be 550 to 750 MPa.

As described above, the non-oriented electrical steel sheet according to the embodiment of the present invention may secure excellent iron loss after stress relief annealing. Specifically, after stress relief annealing performed at a temperature of 750° C. for 2 hours, the measured iron loss ($W_{10/400}$) may be 12 W/kg or less. The iron loss is iron loss when the magnetic flux density of 1.0 T is induced with a frequency of 400 Hz. More specifically, after the stress relief annealing, the measured iron loss ($W_{10/400}$) may be 10 to 11 W/kg.

A manufacturing method of the non-oriented electrical steel sheet according to an embodiment of the present invention includes: heating a slab that contains C at 0.004 wt % or less (excluding 0 wt %), Si at 2.5 to 4.0 wt %, P at 0.1 wt % or less (excluding 0 wt %), Al at 0.3 to 2.0 wt %, N at 0.003 wt % or less (excluding 0 wt %), S at 0.003 wt % or less (excluding 0 wt %), Mn at 0.15 to 2.5 wt %, Cr at 0.5 wt % (excluding 0 wt %), and the balance including Fe and other impurities unavoidably added thereto and satisfies Equation 1 below; hot rolling the slab to manufacture a hot rolled sheet; cold rolling the hot rolled sheet to manufacture a cold rolled sheet; and final annealing the cold rolled sheet.

Hereinafter, each step will be specifically described.

First, the slab is heated. The reason for limiting the addition ratio of each composition in the slab is the same as the reason for limiting the composition of the non-oriented electrical steel sheet described above, so a repeated description will be omitted. Since the slab composition is not substantially changed during manufacturing processes including hot rolling, hot rolled sheet annealing, cold rolling, and final annealing to be described later, the composition of the slab and the composition of the non-oriented electrical steel sheet are substantially the same.

The slab is fed into a furnace and heated at 1100 to 1250° C. When heated at a temperature exceeding 1250° C., a precipitate may be redissolved, and it may be finely precipitated after the hot-rolling.

When the slab is heated, hot rolling is performed with 2.0 to 2.3 mm, and the hot rolled sheet is wound. The wound hot rolled sheet is subjected to hot rolled sheet annealing as necessary. It is manufactured as a hot rolled sheet.

After the manufacturing of the hot rolled sheet, hot-rolled-sheet-annealing of the hot rolled sheet may be further included. In this case, a temperature of the hot-rolled-sheet-annealing may be 850 to 1200° C. When the temperature of the hot-rolled sheet annealing is too low, there is little effect of increasing the magnetic flux density because the structure does not grow, or finely grows, and when the temperature of the annealing is too high, magnetic properties are rather deteriorated, and rolling workability may be deteriorated due to deformation of a shape of the sheet. The hot-rolled-sheet-annealing is performed in order to increase the orientation favorable to magnetism as required, and it may be omitted. Presence/absence of the hot rolled sheet annealing process does not significantly affect the grain size of the final manufactured electrical steel sheet.

Next, the hot rolled sheet is pickled and then cold rolled to have a predetermined sheet thickness. Although It can be applied differently depending on the thickness of the hot rolled sheet, cold rolling may be performed so that the final thickness thereof becomes 0.2 to 0.65 mm, by applying a reduction ratio of 70 to 95%. The cold rolling may be performed by one cold rolling or, if necessary, by two or more cold rollings with intermediate annealing interposed therebetween.

The final cold-rolled sheet is subjected to final annealing. In this case, the final annealing can be performed at a temperature of 710 to 820° C. so that an appropriate grain size is formed. When the final annealing is performed at too low a temperature, a non-recrystallized fraction is too large such that the magnetic flux density rapidly decreases, so that the rotor may not obtain the required characteristics even if it has high strength. In addition, when heat treatment is performed at too high a temperature, the grain size is coarsened, and thus a desired strength characteristic is not obtained. Here, the final annealing temperature means a soaking temperature.

The final annealing time may be 10 seconds to 3 minutes. In this case, the final annealing time refers to a time from reaching the soaking temperature by heating the cold-rolled sheet to the end of the soaking.

The final annealing atmosphere may be an atmosphere containing 10 to 30 vol % of hydrogen and 70 to 90 vol % of nitrogen.

Next, it may further include forming an insulating layer. Except for thinning the thickness thereof, the insulating layer may be formed by using a typical method. The method of forming the insulating layer is widely known in the field of non-oriented electrical steel sheet technology, so a detailed description thereof is omitted. Specifically, as a composition for forming the insulating layer, either a chromium-type or a chromium-free type may be used without limitation.

Next, a stress relief annealing step that is performed at a temperature range of 700 to 900° C. may be further included. As described above, according to the non-oriented electrical steel sheet according to the embodiment of the present invention may improve the iron loss characteristic by growing recrystallization in the stress relief annealing. Specifically, after the stress relief annealing, the grain size may be 30 to 300 μm.

Hereinafter, preferred examples of the present invention and comparative examples will be described. However, the following examples are only preferred examples of the present invention, and the present invention is not limited to the following examples.

Example 1

In wt %, a slab containing values of the following Table 1 and Table 2 and the balance of Fe and other inevitable impurities was prepared. The slab was reheated at 1130° C., and then hot-rolled to 2.0 mm to prepare a hot rolled sheet. Each prepared hot rolled sheet was wound at 620° C., cooled in air, and then subjected to hot rolled sheet annealing at 1020° C. for 2 minutes. Subsequently, after pickling the hot rolled sheet, cold rolling was performed to have a thickness of 0.25 mm. Subsequently, the cold-rolled sheet was subjected to final annealing for 1 minute at the temperature given in Table 2 below under the atmosphere condition of 20 vol % of hydrogen and 80 vol % of nitrogen, and then the magnetic and mechanical characteristics thereof were analyzed and are summarized in Table 3 below. The yield strength among the properties before the stress relief annealing was determined as a value at 0.2% offset after a tensile test was performed by making a specimen of the KS 13B standard; the precipitate density was measured using a transmission electron microscope replication method; the magnetic flux density ($B_{50}$) was measured in the rolling direction and the rolling perpendicular direction using a single plate measurer having a size of 60×60 mm², and was obtained as an average; and the average grain size was determined by taking the square root by obtaining the average grain area from an optical microscope photograph. The iron loss ($W_{10/400}$) after the stress relief annealing was obtained by stress-relief-annealing the steel sheet for 2 hours at a temperature of 750° C., measuring it in the rolling direction and the rolling perpendicular direction by using a single-plate measurer having a size of 60×60 mm², and then averaging them.

TABLE 1

| Steel type (wt %) | C | Si | P | Al | N | Cr | Nb | Ti |
|---|---|---|---|---|---|---|---|---|
| A | 0.003 | 3.1 | 0.02 | 1 | 0.002 | 0.2 | 0.0015 | 0.001 |
| B | 0.003 | 2.6 | 0.01 | 1.2 | 0.002 | 0.1 | 0.0015 | 0.001 |
| C | 0.003 | 3.1 | 0.01 | 1.0 | 0.002 | 3.0 | 0.0015 | 0.002 |

TABLE 2

| Specimen number | Steel type | Mn (wt %) | S (wt %) | Right-hand side value of Equation 1 | Final annealing temperature (° C.) |
|---|---|---|---|---|---|
| 1 | A | 0.1 | 0.0006 | 0.07 | 770 |
| 2 | A | 0.1 | 0.0002 | −0.51 | 770 |
| 3 | A | 0.2 | 0.0002 | −0.51 | 770 |
| 4 | A | 0.2 | 0.0001 | −0.66 | 770 |

TABLE 2-continued

| Specimen number | Steel type | Mn (wt %) | S (wt %) | Right-hand side value of Equation 1 | Final annealing temperature (° C.) |
|---|---|---|---|---|---|
| 5 | A | 0.2 | 0.0006 | 0.07 | 770 |
| 6 | A | 0.2 | 0.0008 | 0.36 | 770 |
| 7 | A | 0.4 | 0.0008 | 0.36 | 770 |
| 8 | A | 0.4 | 0.0011 | 0.8 | 770 |
| 9 | A | 0.9 | 0.0011 | 0.8 | 770 |
| 10 | A | 0.7 | 0.0012 | 0.94 | 770 |
| 11 | A | 1.2 | 0.0012 | 0.94 | 770 |
| 12 | A | 1.1 | 0.0015 | 1.38 | 770 |
| 13 | A | 1.4 | 0.0011 | 0.8 | 770 |
| 14 | A | 1.5 | 0.0015 | 1.38 | 770 |
| 15 | A | 1.5 | 0.0018 | 1.81 | 770 |
| 16 | A | 1.5 | 0.001 | 0.65 | 770 |
| 17 | A | 1.6 | 0.0019 | 1.96 | 770 |
| 18 | A | 1.8 | 0.0015 | 1.38 | 770 |
| 19 | A | 1.9 | 0.0018 | 1.81 | 770 |
| 20 | A | 2 | 0.0019 | 1.96 | 770 |
| 21 | A | 2.2 | 0.0018 | 1.81 | 770 |
| 22 | A | 2.8 | 0.0025 | 2.83 | 770 |
| 23 | A | 3.4 | 0.0025 | 2.83 | 770 |
| 24 | A | 1 | 0.0012 | 0.94 | 680 |
| 25 | A | 1 | 0.0012 | 0.94 | 700 |
| 26 | A | 1 | 0.0012 | 0.94 | 720 |
| 27 | A | 1 | 0.0012 | 0.94 | 740 |
| 28 | A | 1 | 0.0012 | 0.94 | 750 |
| 29 | A | 1 | 0.0012 | 0.94 | 770 |
| 30 | A | 1 | 0.0012 | 0.94 | 800 |
| 31 | A | 1 | 0.0012 | 0.94 | 810 |
| 32 | A | 1 | 0.0012 | 0.94 | 830 |
| 33 | A | 1 | 0.0012 | 0.94 | 850 |
| 34 | B | 0.1 | 0.0006 | 0.07 | 770 |
| 35 | B | 0.2 | 0.0006 | 0.07 | 770 |
| 36 | B | 0.2 | 0.0008 | 0.36 | 770 |
| 37 | B | 0.4 | 0.0008 | 0.36 | 770 |
| 38 | B | 0.5 | 0.0011 | 0.8 | 770 |
| 39 | B | 0.9 | 0.0011 | 0.8 | 770 |
| 40 | B | 0.8 | 0.0012 | 0.94 | 770 |
| 41 | B | 1.1 | 0.0012 | 0.94 | 770 |
| 42 | B | 1.2 | 0.0015 | 1.38 | 770 |
| 43 | B | 1.4 | 0.0015 | 1.38 | 770 |
| 44 | B | 1.5 | 0.0018 | 1.81 | 770 |
| 45 | B | 1.7 | 0.0019 | 1.96 | 770 |
| 46 | B | 2 | 0.0019 | 1.96 | 770 |
| 47 | B | 1.1 | 0.0012 | 0.94 | 700 |
| 48 | B | 1.1 | 0.0012 | 0.94 | 720 |
| 49 | B | 1.1 | 0.0012 | 0.94 | 740 |
| 50 | B | 1.1 | 0.0012 | 0.94 | 750 |
| 51 | B | 1.1 | 0.0012 | 0.94 | 770 |
| 52 | B | 1.1 | 0.0012 | 0.94 | 800 |
| 53 | B | 1.1 | 0.0012 | 0.94 | 810 |
| 54 | B | 1.1 | 0.0012 | 0.94 | 830 |
| 55 | C | 1.1 | 0.0012 | 0.94 | 720 |

TABLE 3

| Specimen number | Before stress relief annealing | | | | After stress relief annealing | Remarks |
|---|---|---|---|---|---|---|
| | Yield Strength (MPa) | Sulfide density (10,000/mm$^2$) | Magnetic flux Density (B$_{50}$, T) | Average grain size (μm) | Iron loss (W$_{10/400}$, W/kg) | |
| 1 | 589 | 39 | 1.69 | 6 | 14.5 | Comparative Material 1 |
| 2 | 575 | 30 | 1.68 | 7 | 13.8 | Comparative Material 2 |
| 3 | 580 | 10 | 1.69 | 6 | 10.3 | Inventive Material 1 |
| 4 | 570 | 5 | 1.68 | 7 | 10.2 | Inventive Material 2 |
| 5 | 585 | 15 | 1.69 | 7 | 11.5 | Inventive Material 3 |
| 6 | 585 | 27 | 1.7 | 6.5 | 13.7 | Comparative Material 3 |
| 7 | 588 | 18 | 1.69 | 7.5 | 10.7 | Inventive Material 4 |
| 8 | 582 | 26 | 1.67 | 6.5 | 12.8 | Comparative Material 4 |
| 9 | 589 | 19 | 1.67 | 7 | 10.8 | Inventive Material 5 |
| 10 | 587 | 27 | 1.67 | 7 | 12.9 | Comparative Material 5 |
| 11 | 591 | 21 | 1.67 | 8 | 10.5 | Inventive Material 6 |
| 12 | 594 | 26 | 1.66 | 7.5 | 12.8 | Comparative Material 6 |
| 13 | 588 | 16 | 1.67 | 10 | 10.6 | Inventive Material 7 |
| 14 | 600 | 22 | 1.67 | 7.5 | 10.6 | Inventive Material 8 |
| 15 | 605 | 48 | 1.66 | 9 | 12.6 | Comparative Material 7 |
| 16 | 600 | 10 | 1.66 | 9 | 10.5 | Inventive Material 9 |
| 17 | 607 | 28 | 1.65 | 8 | 12.9 | Comparative Material 8 |
| 18 | 589 | 12 | 1.67 | 9 | 10.5 | Inventive Material 10 |
| 19 | 591 | 23 | 1.66 | 7 | 10.8 | Inventive Material 11 |
| 20 | 625 | 24 | 1.66 | 7 | 11.2 | Inventive Material 12 |
| 21 | 605 | 16 | 1.67 | 9 | 11.3 | Inventive Material 13 |
| 22 | 619 | 24 | 1.58 | 9 | 10.9 | Comparative Material 9 |
| 23 | 625 | 35 | 1.56 | 8 | 10.5 | Comparative Material 10 |
| 24 | 940 | 19 | 1.54 | Non-recrystallized | 11.5 | Comparative Material 11 |
| 25 | 800 | 18 | 1.55 | Non-recrystallized | 10.8 | Comparative Material 12 |
| 26 | 715 | 19 | 1.63 | 2 | 10.7 | Inventive Material 14 |
| 27 | 687 | 17 | 1.64 | 3 | 10.8 | Inventive Material 15 |
| 28 | 661 | 18 | 1.64 | 5 | 10.6 | Inventive Material 16 |
| 29 | 628 | 20 | 1.64 | 7 | 10.5 | Inventive Material 17 |
| 30 | 600 | 19 | 1.65 | 10 | 10.6 | Inventive Material 18 |
| 31 | 580 | 16 | 1.66 | 15 | 10.6 | Inventive Material 19 |
| 32 | 460 | 19 | 1.66 | 23 | 10.7 | Comparative Material 13 |
| 33 | 450 | 19 | 1.65 | 40 | 11.5 | Comparative Material 14 |
| 34 | 564 | 39 | 1.67 | 7 | 13.5 | Comparative Material 15 |
| 35 | 560 | 15 | 1.69 | 6 | 11.5 | Inventive Material 20 |
| 36 | 560 | 27 | 1.7 | 7 | 12.5 | Comparative Material 16 |
| 37 | 563 | 18 | 1.69 | 8 | 10.7 | Inventive Material 21 |
| 38 | 557 | 26 | 1.67 | 6 | 12.3 | Comparative Material 17 |

TABLE 3-continued

| | Before stress relief annealing | | | | After stress relief annealing | |
|---|---|---|---|---|---|---|
| Specimen number | Yield Strength (MPa) | Sulfide density (10,000/ mm$^2$) | Magnetic flux Density (B$_{50}$, T) | Average grain size (μm) | Iron loss (W$_{10/400}$, W/kg) | Remarks |
| 39 | 564 | 19 | 1.67 | 7 | 10.8 | Inventive Material 22 |
| 40 | 562 | 27 | 1.67 | 8 | 12.9 | Comparative Material 18 |
| 41 | 566 | 21 | 1.67 | 6 | 10.5 | Inventive Material 23 |
| 42 | 569 | 26 | 1.66 | 7 | 12.8 | Comparative Material 19 |
| 43 | 575 | 22 | 1.67 | 6 | 10.6 | Inventive Material 24 |
| 44 | 580 | 27 | 1.66 | 7 | 12.6 | Comparative Material 20 |
| 45 | 582 | 28 | 1.65 | 7 | 12.9 | Comparative Material 21 |
| 46 | 600 | 24 | 1.66 | 6 | 11.2 | Inventive Material 25 |
| 47 | 729 | 18 | 1.55 | Non-recrystallized | 10.8 | Comparative Material 22 |
| 48 | 690 | 19 | 1.63 | 2 | 10.7 | Inventive Material 26 |
| 49 | 662 | 17 | 1.64 | 3 | 10.8 | Inventive Material 27 |
| 50 | 636 | 18 | 1.65 | 5 | 10.6 | Inventive Material 28 |
| 51 | 603 | 20 | 1.67 | 7 | 10.5 | Inventive Material 29 |
| 52 | 575 | 19 | 1.67 | 10 | 10.6 | Inventive Material 30 |
| 53 | 555 | 16 | 1.67 | 15 | 10.6 | Inventive Material 31 |
| 54 | 450 | 19 | 1.67 | 23 | 10.7 | Comparative Material 23 |
| 55 | 720 | 25 | 1.55 | 3 | 12.5 | Comparative Material 24 |

As shown in Table 1 to Table 3, it can be confirmed that the inventive material in which the contents of Mn and S and the grain size are controlled may simultaneously improve the yield strength and the magnetism before and after the stress relief annealing.

On the other hand, when the contents of Mn and S are not satisfied, it can be confirmed that the magnetism before and after the stress relief annealing, particularly, the iron loss characteristic after the stress relief annealing, are deteriorated.

In addition, when the final annealing temperature is too low and there is a large amount of non-crystallized structure (90 vol % or more of non-crystallized structure), it can be confirmed that the magnetic flux density is significantly deteriorated.

In addition, when the final annealing temperature is too high and the average grain size is too large, it can be confirmed that the yield strength is significantly deteriorated.

Further, in the case of steel type C with a large amount of Cr added, it can be confirmed that the magnetic properties before and after the stress relief annealing are deteriorated.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, it is to be understood that the above-described exemplary embodiments are for illustrative purposes only, and the scope of the present invention is not limited thereto.

The invention claimed is:

1. A non-oriented electrical steel sheet, comprising:
in wt %, C at 0.004 wt % or less and greater than 0 wt %, Si at 2.5 to 4.0 wt %, P at 0.1 wt % or less and greater than 0 wt %, Al at 0.3 to 2.0 wt %, N at 0.003 wt % or less and greater than 0 wt %, S at 0.003 wt % or less and greater than 0 wt %, Mn at 0.15 to 2.5 wt %, Cr at 0.001 wt % to 0.2 wt %, Cu at 0.1 wt % or less and the balance including Fe and other impurities unavoidably added thereto;
satisfying Equation 1 below; and
having an average grain size of 20 μm or less:

$$[Mn] \geq 1450 \times [S] - 0.8 \qquad \text{[Equation 1]}$$

wherein in Equation 1, [Mn] and [S] represent a content in wt % of Mn and S, respectively,
wherein a density of sulfide having a diameter of 1 nm to 0.1 μm is 10,000/mm$^2$ to 240,000/mm$^2$.

2. The non-oriented electrical steel sheet of claim 1, further comprising
one or more of Ti at 0.003 wt % or less, and Nb at 0.003 wt % or less.

3. The non-oriented electrical steel sheet of claim 1, wherein the sulfide includes MnS or CuS.

4. The non-oriented electrical steel sheet of claim 1, wherein
a magnetic flux density (B$_{50}$) induced in a magnetic field of 5000 is 1.61 T or more, and the non-oriented electrical steel sheet has a yield strength of 500 MPa or more.

5. The non-oriented electrical steel sheet of claim 1, wherein
iron loss (W$_{10/400}$) measured after stress relief annealing that is performed at a temperature of 750° C. for 2 hours is 12 W/kg or less.

* * * * *